UNITED STATES PATENT OFFICE.

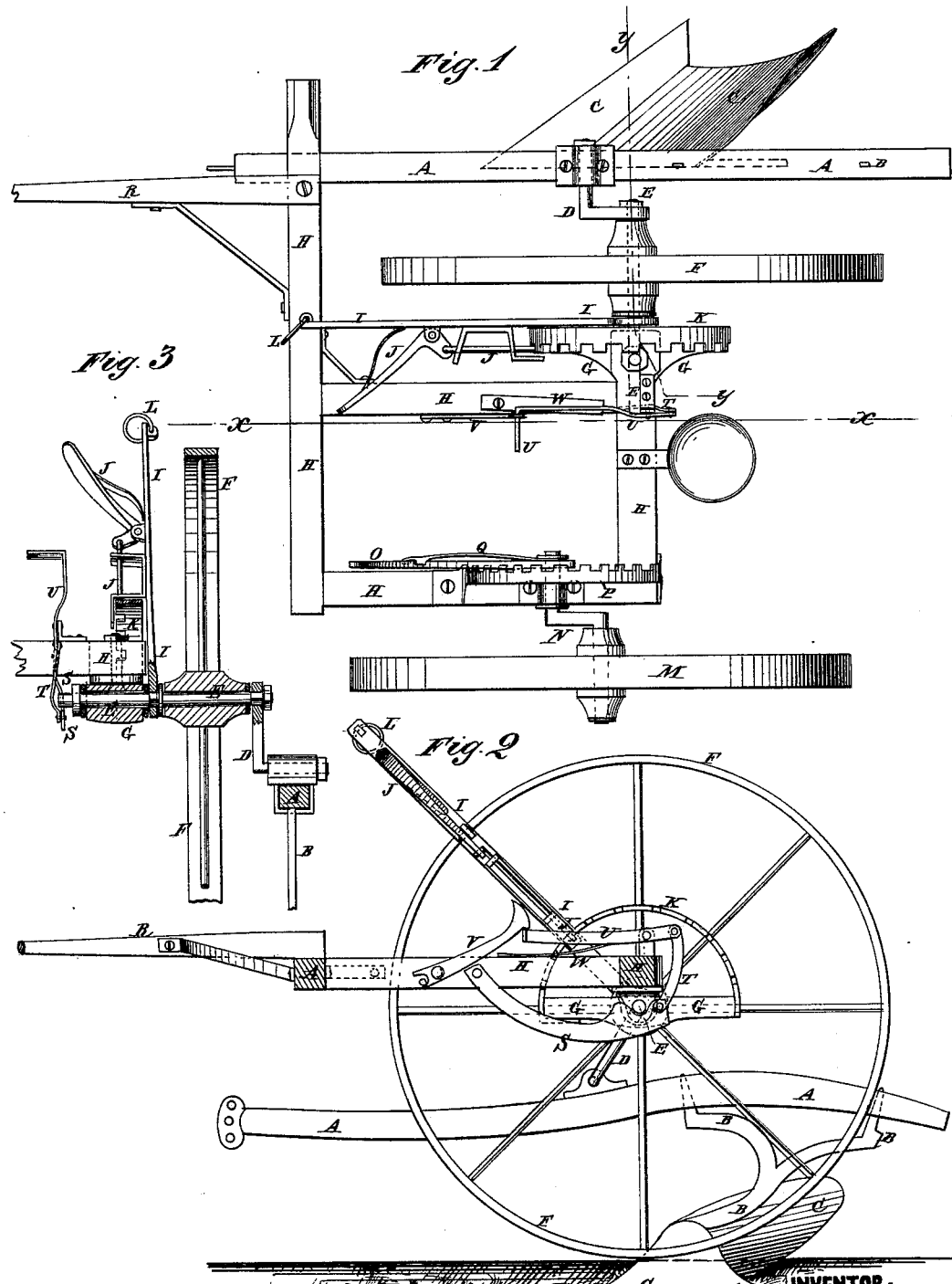

HARLOW M. FREEMAN, OF LATHROP, MISSOURI.

IMPROVEMENT IN RIDING ATTACHMENTS TO PLOWS.

Specification forming part of Letters Patent No. 203,027, dated April 30, 1878; application filed February 21, 1878.

*To all whom it may concern:*

Be it known that I, HARLOW M. FREEMAN, of Lathrop, in the county of Clinton and State of Missouri, have invented a new and useful Improvement in Riding Attachment for Plows, of which the following is a specification:

Figure 1 is a top view of my improved device. Fig. 2 is a vertical longitudinal section of the same, taken through the line $x\ x$, Fig. 1. Fig. 3 is a vertical cross-section of a part of the same, taken through the line $y\ y$, Fig. 1.

Similar letters of reference indicate corresponding parts.

The object of this invention is to furnish an improved riding attachment for plows, which shall be so constructed that the plow may be adjusted to work at any desired depth in the ground that it will enable the frame to be kept level whether the plow be running upon a level with the wheel or below said wheel, and that will enable the plow to be turned upon a square corner, and which shall be simple in construction, and conveniently adjusted and controlled.

The invention consists in the combination of the crank, the axle, the pivoted block, and the lever, with the plow-beam, the wheel, and the frame, and in the combination of the notched bar, the connecting-bar, the catch-lever, the latch, and the spring, with the axle and the frame, as hereinafter fully described.

A is the plow-beam, to the forward end of which the draft is applied, and to the rear part of which is attached the forked upper end of the standard B. The standard B, at the top of the plow C, which is attached to its lower end, is made with a rearward curve or bend, to give more room for rubbish to pass off, and thus render the plow less liable to be choked. To the middle part of the beam A is attached a bearing in which works a crank, D, rigidly attached to the outer end of the axle E. Upon the outer part of the axle E revolves a wheel, F, and the inner part of said axle E works in a cross-head block, G, which is pivoted at its center to the rear corner of the frame H. To the axle E, between the wheel F and the cross-head block G, is rigidly attached the end of the lever I. To the lever I is attached a spring-lever pawl, J, which engages with the notches of the curved bar K, to hold the said lever I securely in any position into which it may be adjusted, and which may be held away from the notched bar K by passing a ring, L, pivoted to the upper end of the said lever I, over the end of the said lever-pawl J. This arrangement leaves the plow C entirely free. M is the other wheel, which revolves upon the outer arm of the crank-axle N, the other arm of which works in bearings attached to the side bar of the frame H. To the end of the inner arm of the crank-axle N is rigidly attached the lower end of the lever O, which is held against the notched bar P by a spring, Q, also attached to the end of the crank-axle N. The notched bar P is curved, and its ends are attached to a side bar of the frame H. This arrangement enables the wheel M to be adjusted to keep the frame H level when the wheel F is running at the same level as the plow, as, for instance, when plowing the last furrow of a "land." R is the tongue, which is attached to the forward cross-bar of the frame H, or to an extension of said cross-bar, in such a position as to be between the off horses.

With this construction the frame H and the near wheel M are turned at the corner of a land by the pressure of the neck-yoke against the tongue R, and the plow A B C and the off wheel F are then turned by the draft upon the plow-beam A. This construction enables the plow to turn a square corner.

The inner end of the axle E projects upon the inner side of the cross-head block G, so as to enter a notch in the upper side of the rear end of the curved bar S, the forward end of which is pivoted to the side bar of the frame H.

To the rear end of the bar S is pivoted the lower end of a short connecting-bar, T, the upper end of which is pivoted to the rear end of a lever, U. The lever U is pivoted at a little distance from its rear end to the upper side of the rear cross-bar of the frame H, or to a support attached to said cross-bar, and its forward end is bent to one side to form a latch to catch upon the shoulder of the catch V, the shank of which is pivoted to the side bar of the frame H. The movement of the catch V is limited by a stop-pin attached to the side bar of the frame H, and which enters a notch in the pivoted end of the said catch V.

The forward end of the lever U is thrown up when released from the catch V by a spring, W, attached to the side bar of the frame H, and upon the free end of which the said lever U rests.

The device S T U V W locks the axle E to the frame H, so that the said frame H and the near wheel M cannot be turned without carrying the off wheel F and the plow A B C with it, and is especially intended for use when drawing the machine from place to place.

Having thus described my invention, I claim as new and desire to secure by Letters Patent—

1. The combination of the crank D, the axle E, the pivoted block G, and the lever I with the plow-beam A, the wheel F, and the frame H, substantially as herein shown and described.

2. The combination of the notched bar S, the connecting-bar T, the catch-lever U, the latch V, and the spring W with the axle E and the frame H, substantially as herein shown and described.

HARLOW M. FREEMAN.

Witnesses:
ELIJAH HUSSEY,
JOHN F. STEVENS.